(12) United States Patent
Sradnick

(10) Patent No.: US 10,406,465 B2
(45) Date of Patent: *Sep. 10, 2019

(54) DRAIN CONTROL DEVICE FOR A FILTER SYSTEM AS WELL AS FILTER SYSTEM WITH A DRAIN CONTROL DEVICE

(71) Applicant: MANN+HUMMEL GMBH, Ludwigsburg (DE)

(72) Inventor: Holger Sradnick, Ditzingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 194 days.

This patent is subject to a terminal disclaimer.

(21) Appl. No.: 15/581,498

(22) Filed: Apr. 28, 2017

(65) Prior Publication Data
US 2017/0312669 A1    Nov. 2, 2017

(30) Foreign Application Priority Data
Apr. 29, 2016   (DE) ................. 10 2016 005 271

(51) Int. Cl.
*B01D 36/00*    (2006.01)
*B01D 35/00*    (2006.01)
(Continued)

(52) U.S. Cl.
CPC ......... *B01D 36/005* (2013.01); *B01D 35/005* (2013.01); *B01D 36/006* (2013.01);
(Continued)

(58) Field of Classification Search
CPC .................. B01D 2201/16; B01D 35/005; B01D 36/005; B01D 36/006; F02M 37/24; F02M 37/28
See application file for complete search history.

(56) References Cited

U.S. PATENT DOCUMENTS 4,579,653 A    4/1986   Davis
6,645,372 B2 * 11/2003  Girondi ............... B01D 36/005
                                                   210/104
(Continued)

FOREIGN PATENT DOCUMENTS

CN    201714534 U    1/2011
CN    202596944 U    12/2012
(Continued)

*Primary Examiner* — Terry K Cecil
(74) *Attorney, Agent, or Firm* — James Hasselbeck

(57) ABSTRACT

A drain control device for a filter system for filtering a media flow of a first medium and a second medium, wherein the filter system has a collecting chamber collecting the second medium separated from the media flow and provided with a media outlet, has a sensor arrangement with at least a first sensor unit. The first sensor unit detects a filling level of the second medium in the collecting chamber. The first sensor unit has a first optical sensor. One or more shut-off valves are arranged at the media outlet. The first sensor unit is coupled with the one or more shut-off valves to automatically drain the second medium from the collecting chamber through the media outlet when a predetermined filling level of the second medium in the collecting chamber is reached. A filter system with such a drain control device is provided.

19 Claims, 5 Drawing Sheets

(51) Int. Cl.
*F02M 37/22* (2019.01)
*F02M 37/28* (2019.01)
*F02M 37/24* (2019.01)

(52) U.S. Cl.
CPC ......... *F02M 37/28* (2019.01); *B01D 2201/16* (2013.01); *F02M 37/24* (2019.01)

(56) References Cited

U.S. PATENT DOCUMENTS

| | | | |
|---|---|---|---|
| 7,476,310 B2* | 1/2009 | Girondi | B01D 36/006 210/103 |
| 2001/0042725 A1 | 11/2001 | Goodrich | |
| 2002/0036163 A1 | 3/2002 | Miller et al. | |
| 2003/0121860 A1 | 7/2003 | Harenbrock et al. | |
| 2006/0207924 A1 | 9/2006 | De La Azuela et al. | |
| 2008/0237503 A1* | 10/2008 | Albertson | G01D 5/262 250/564 |
| 2009/0114287 A1 | 5/2009 | Abdalla | |
| 2009/0145823 A1 | 6/2009 | Lauer | |
| 2009/0173639 A1 | 7/2009 | Ferrari et al. | |
| 2010/0096304 A1 | 4/2010 | Gänswein et al. | |
| 2010/0101984 A1 | 4/2010 | Roesgen et al. | |
| 2010/0154727 A1 | 6/2010 | Malgorn et al. | |
| 2011/0000833 A1 | 1/2011 | Eberle | |
| 2011/0041920 A1 | 2/2011 | Abdalla | |
| 2011/0147290 A1 | 6/2011 | Braunheim | |
| 2011/0174717 A1 | 7/2011 | Braunheim et al. | |
| 2011/0186501 A1 | 8/2011 | Braunheim | |
| 2012/0103910 A1 | 5/2012 | Ferrari | |
| 2013/0153487 A1 | 6/2013 | Terry et al. | |
| 2015/0006059 A1* | 1/2015 | Castleberry | G01N 33/2835 701/102 |

FOREIGN PATENT DOCUMENTS

| | | |
|---|---|---|
| CN | 202746068 U | 2/2013 |
| CN | 202914212 U | 5/2013 |
| DE | 10055946 A1 | 5/2002 |
| DE | 102004036070 A1 | 2/2006 |
| DE | 102004053645 A1 | 5/2006 |
| DE | 60119512 T2 | 9/2006 |
| DE | 102006046752 A1 | 4/2007 |
| DE | 102007039661 A1 | 3/2008 |
| DE | 102009052301 A1 | 5/2011 |
| DE | 102009059147 A1 | 6/2011 |
| DE | 112010003359 T5 | 6/2012 |
| DE | 102011076413 A1 | 11/2012 |
| EP | 1205225 A1 | 5/2002 |
| EP | 2393572 A1 | 12/2011 |
| GB | 2065336 A | 6/1981 |
| IN | 2089/MUM/2012 A | 5/2014 |
| KR | 20010019911 A | 3/2001 |
| KR | 100384298 B1 | 5/2002 |
| WO | 2015081222 A1 | 6/2015 |

* cited by examiner

DRAIN CONTROL DEVICE FOR A FILTER SYSTEM AS WELL AS FILTER SYSTEM WITH A DRAIN CONTROL DEVICE

BACKGROUND OF THE INVENTION

The invention concerns a drain control device for a filter system for filtering a media flow comprising a first and second medium as well as a filter system with a drain control device, in particular in a fuel supply system, in particular a diesel fuel supply system of a motor vehicle.

It is known to separate in fuel filter systems water from diesel fuel and to drain it as needed. Known from DE 11 2010 003 359 T5 is an automatic outlet system in a filter system with a float valve that is arranged within a filter housing in a float valve chamber and has a solenoid valve arranged downstream thereof in flow connection. The float valve exhibits a density that is less than that of a first medium and greater than that of a second medium. In a float position it is possible for the first medium to pass through a float valve opening when the float valve chamber is filled with the first medium. In a sealed position, i.e., when the float valve chamber is not filled with the first medium, it is prevented that the first and second medium passes through the float valve opening. The solenoid valve comprises a solenoid opening that is open when the solenoid valve is switched on and that is closed when the solenoid valve is switched off.

SUMMARY OF THE INVENTION

It is an object of the invention to improve a drain control device of a filter system for filtering a media flow comprising a first medium and a second medium.

A further object of the invention is to provide a filter system with a drain control device.

The aforementioned objects are solved according to one aspect of the invention for a drain control device as well as for a filter system in that a sensor arrangement with at least a first sensor unit is provided that is coupled with at least one shut-off valve in order to automatically drain the second medium when a drain criterion is reached, wherein the first sensor unit comprises an optical sensor.

Beneficial configurations and advantages of the invention result from the further claims, the description, and the drawing.

A drain control device for a filter system for filtering a media flow comprising a first medium and a second medium is proposed. The filter system comprises a collecting chamber which is provided for collecting the second medium that has been separated from the media flow. The drain control device comprises a sensor arrangement with at least a first sensor unit, wherein the first sensor unit comprises an optical sensor. The first sensor unit is coupled with at least one shut-off valve in order to drain the second medium automatically through a media outlet of the collecting chamber when a drain criterion is reached.

Beneficially, the optical sensor can detect a radiation intensity, in particular light intensity, which penetrates the medium contained in the collecting chamber. This is advantageous when the transmission properties for the radiation, for example, light radiation, of the first medium differs greatly from that of the second medium.

Advantageously, with the drain control device a safe and reliable operation of the filter system can be achieved even for long service lives. It can be achieved that practically pure second medium, in particular at least 90% (volume percent), and no mixture of first medium and second medium is discharged from the collecting chamber. The first medium can be a fuel, in particular diesel fuel; the second medium can be water.

A single shut-off valve can be provided that opens or closes a media outlet of the collecting chamber, or two or more shut-off valves that are connected fluidically in series can be provided which can be constructed identically or differently.

According to a beneficial embodiment, the sensor arrangement of the drain control device can comprise at least a first sensor unit and a second sensor unit, wherein the first and the second sensor units are based on different action mechanisms.

Since at least two sensor units are provided which detect the presence of the second medium in the collecting chamber, the reliability of the drain control device can be increased. Since the at least two sensor units are based on different action mechanisms, the presence of the second medium in the collecting chamber can be detected by each sensor unit independent from the other sensor unit.

The drain criterion is a filling level of the second medium in the collecting chamber or, more precisely, reaching or surpassing a predetermined filling level of the second medium. Drainage of the second medium from the collecting chamber can be realized by the pressure of the first medium located above the second medium, or by the force of gravity acting on the second medium, or by a pressure which is present in a volume fluidically downstream of the collecting chamber and which is produced by a pump or by a corresponding pressure difference between the collecting chamber and the volume.

Different action mechanisms are in particular different physical measuring principles, for example, the detection of an electrical resistance of a medium present in the collecting chamber, the detection of a magnetic field, the detection of a radiation, and the like.

According to a beneficial embodiment, at least two shut-off valves can be fluidically connected in series. In this way, it can be achieved that the two shut-off valves open when the sensor units detect the second medium and a drain criterion is reached.

According to a beneficial embodiment, each sensor unit can have correlated therewith a separate shut-off valve. Accordingly, each shut-off valve can be controlled independent of the other one. It can be ensured that practically only the second medium is drained.

According to a beneficial embodiment, one of the sensor units can be provided for direct control of one of the shut-off valves, and the other one of the sensor units can be correlated with the other one of the shut-off valves. The direct control enables switching of the shut-off valve by means of a sensor signal. The other one of the sensor units can send its sensor signal to a control device coupled with this sensor unit, for example, a vehicle control unit, which is provided for controlling the other one of the shut-off valves and then controls correspondingly the other one of the shut-off valves correlated with this sensor unit.

According to a beneficial embodiment, the sensor units can be coupled with a control device which is provided for controlling the shut-off valves. The sensor units can supply their sensor signals to the control device, for example, a vehicle control unit. The control device can perform logic operations with the sensor signals of the sensor units and thereby ensure that the shut-off valves are opened when all sensor units detect the presence of the second medium in the collecting chamber and at least one drain criterion is fulfilled.

According to a beneficial embodiment, a common shut-off valve can be correlated with the sensor units. This alternative is beneficial when a shut-off valve can be employed that exhibits very high reliability. In this case, the sensor units can be switched in series for activation of the shut-off valve.

According to a beneficial embodiment, the sensor arrangement can comprise a sensor unit with a resistance sensor that measures an electrical resistance of the medium contained in the collecting chamber. This embodiment is advantageous when the electrical resistance of the first medium differs greatly from that of the second medium.

According to a beneficial embodiment, the sensor arrangement can comprise a sensor unit with a magnetic field sensor that detects a magnetic field which penetrates the medium contained in the collecting chamber. This embodiment is advantageous when the density of the two media is different and the float therefore can rise in one of the media. Preferably, the density of the float is less than that of the second medium so that the float, with rising filling level of the second medium in the collecting chamber, will rise together with the second medium. In particular, the sensor arrangement can comprise a reed switch. According to a beneficial configuration, the reed switch can interact with a magnetic float which rises upon presence of the second medium in the collecting chamber. When, due to the presence of the second medium in the collecting area, the reed switch reaches the area of the magnetic field, the reed switch can send out a corresponding signal. In this case, the magnet can rise together with the float with rising filling level of the second medium in the collecting chamber.

According to a beneficial embodiment of the sensor unit with magnetic field sensor, the reed switch can be arranged in a permanent magnetic field that can be shielded by a float which rises when the second medium is present in the collecting chamber. When the shielding action changes with the rising float, the reed switch can detect this and send out a corresponding signal.

According to a beneficial embodiment, the sensor arrangement can comprise a sensor unit with a capacitive sensor. This is beneficial when the permeability of the two media is different.

According to a beneficial embodiment, the optical sensor and/or a light source associated therewith can interact with a float in such a way that above a predetermined filling level of the second medium in the collecting chamber a light path between light source and radiation receiver can be opened. Alternatively, the correlated light source can interact with a float in such a way that above a predetermined filling level of the second medium in the collecting chamber a light path between light source and radiation receiver can be blocked.

According to a beneficial embodiment, the sensor arrangement with optical sensor can be embodied for determining an optical refractive index of the medium contained in the collecting container. For this purpose, a refractometer can be integrated.

According to a further embodiment, the sensor arrangement can comprise at least two optical sensors and a light source that is commonly assigned to both sensors. Of the sensors, a first optical sensor interacts with the float in such a way that above a predetermined filling level of the second medium in the collecting chamber the light path between light source and radiation receiver can be opened. A second optical sensor is embodied for determining an optical refractive index of the medium contained in the collecting container. Since the optical sensors both detect different optical properties (transmission/refractive index), they are based on different action principles in the meaning of the invention. The described embodiment is particularly advantageous for a plausibility check, for example, in order to reliably prevent drainage of a media mix (fuel/water emulsion).

According to a further aspect of the invention, a filter system for filtering a media flow comprising a first medium and a second medium is proposed. The filter system comprises a filter element, which is arranged in a housing and is in particular exchangeable, and a drain control device as well as a collecting chamber in the housing that is provided for collecting the second medium separated from the media flow. The drain control device comprises a sensor arrangement with at least a first sensor unit and a second sensor unit, wherein the first and the second sensor units are based on different action mechanisms and are coupled with at least one shut-off valve in order to drain the second medium automatically through a media outlet of the collecting chamber when a drain criterion is reached.

Advantageously, the reliability for an automatic discharge of the second medium from the collecting chamber can be improved.

According to a beneficial embodiment, the filter system can be configured as a fuel filter system and the drain control device can be provided for draining water separated from fuel from the collecting chamber. Advantageously, a fuel filter system, in particular for diesel fuel, can be provided whose reliability for an automatic discharge of the water from the collecting chamber is improved.

BRIEF DESCRIPTION OF THE DRAWINGS

Further advantages result from the following description of the drawings. In the drawings, embodiments of the invention are illustrated. The drawings, the description, and the claims contain numerous features in combination. A person of skill in the art will expediently also consider the features independently and combine them to meaningful further combinations.

DESCRIPTION OF PREFERRED EMBODIMENTS

Figure 1:
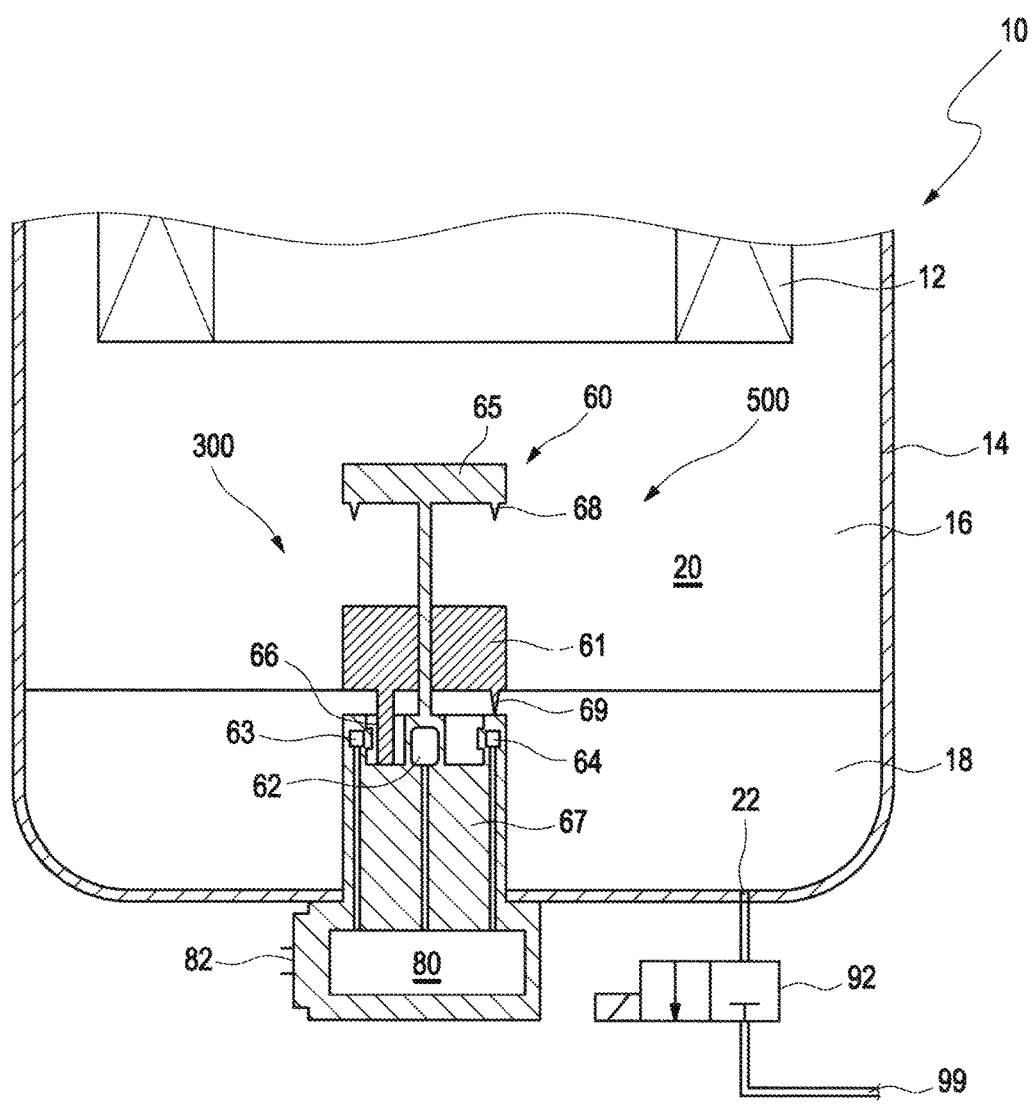
FIG. 1 shows a schematic illustration of an optical sensor for a drain control device according to an embodiment of the invention, in particular for detection of water.

In the Figures, same or same-type components are identified with same reference characters. The Figures show only examples and are not to be understood as limiting.

The invention is described with the aid of a drain control device 500 for a filter system 10 for filtering a media flow comprising a first medium 16 and a second medium 18 wherein the filter system 10, for example, is preferably a fuel filter system and the first medium is diesel fuel and the second medium water that is separated in the filter system 10 from the diesel fuel. Conceivable are however also other fields of application of the filter system 10.

FIG. 1 shows an optical sensor 60 of a drain control device 500 according to an embodiment of the invention, in particular for detection of water. The optical sensor 60 detects a radiation intensity, preferably light intensity, which has penetrated the medium 16, 18 contained in the collecting chamber 20.

The filter system 10 comprises a housing 14 with a filter element 12, arranged therein preferably so as to be exchangeable, as well as a collecting chamber 20 in which a drain control device 500 is arranged. The collecting chamber 20 can be emptied through a media outlet 22 wherein at the media outlet 22 a valve arrangement with, for example, a shut-off valve 92 with outlet 99 is arranged.

The optical sensor 60 comprises a light source 62 arranged in a sensor body 67 that radiates to two sides and has oppositely positioned an optical receiver 63, 64, respectively. The optical sensor 60 is in particular provided in order to be immersed in a liquid medium. In the illustrated embodiment, the light source 62 is centrally arranged and the receivers 63, 64 are arranged opposite each other and opposite the light source 62. As needed, a different geometry can be selected also.

A float guide 65 is extending axially upwardly on the sensor body 67. A float 61 is arranged to be movable along the float guide 65. The float guide 65 has at its free end a stop in the form of a widened portion of the float guide 65 extending transversely to the longitudinal axis of the float guide 65 as a stop for the float 61. In this context, spacers 68, for example, in the form of one or several pins, barbs or spacer rings, can project toward the float 61 so that the float 61 can easily detach from the stop again. Also, on the opposite bottom side of the float 61 one or several spacers 69 can be arranged.

The float 61 utilizes the density difference between diesel fuel and water or first medium and second medium. The float 61 floats in water and sinks in diesel fuel. The float 61 has a diaphragm 66 which covers one of the receivers 63 as long as a filling level of the second medium is low enough. When the filling level of the second medium 18 rises, the float rises along the float guide 65 and opens the view of the receiver 63 onto the light source 62 so that the receiver detects a significantly increased radiation intensity. The receiver 64 that is not covered serves as a reference for the intensity measurement.

When the float 61 is in its lowest position, the receiver 63 is covered and the float 61 is supported by means of the diaphragm 66 between light source 62 and receiver 63 and by the spacers 69 relative to the valve body 67.

When a corresponding quantity of water is contained in the collecting chamber 20 which causes the float 61 to rise, the light source 62 is exposed and the receiver 63 is irradiated by the light of the light source 62 so that the optical sensor 60 emits a corresponding sensor signal to an electronic evaluation device 80 which transmits its signal via a signal output 82 to a control device or the like, not illustrated. When light with sufficient intensity is detected by the receiver 63, the electronic evaluation device 80 will emit a signal with the meaning "water present". When light of a minimal light intensity or no intensity is detected, the electronic evaluation device 80 will emit a signal with the meaning "no water present".

A reverse arrangement, not illustrated, is also conceivable in which the two receivers 63, 64 are illuminated by the light source 62 until the diaphragm 66 is moved in front of one of the receivers 63, 64 due to the rising second medium 18.

According to an embodiment, not illustrated, the optical sensor 60 can also serve for detecting an emulsion, in particular a water emulsion, in the collecting chamber 20. When an emulsion e.g. of water and diesel fuel is contained in the collecting chamber 20 that causes the float 61 to rise, with an adjustment of the optical sensor 60 or of the receiver 63 an emulsion can be detected and a corresponding signal "emulsion detected" can be output by means of the electronic evaluation device 80.

Figure 2:
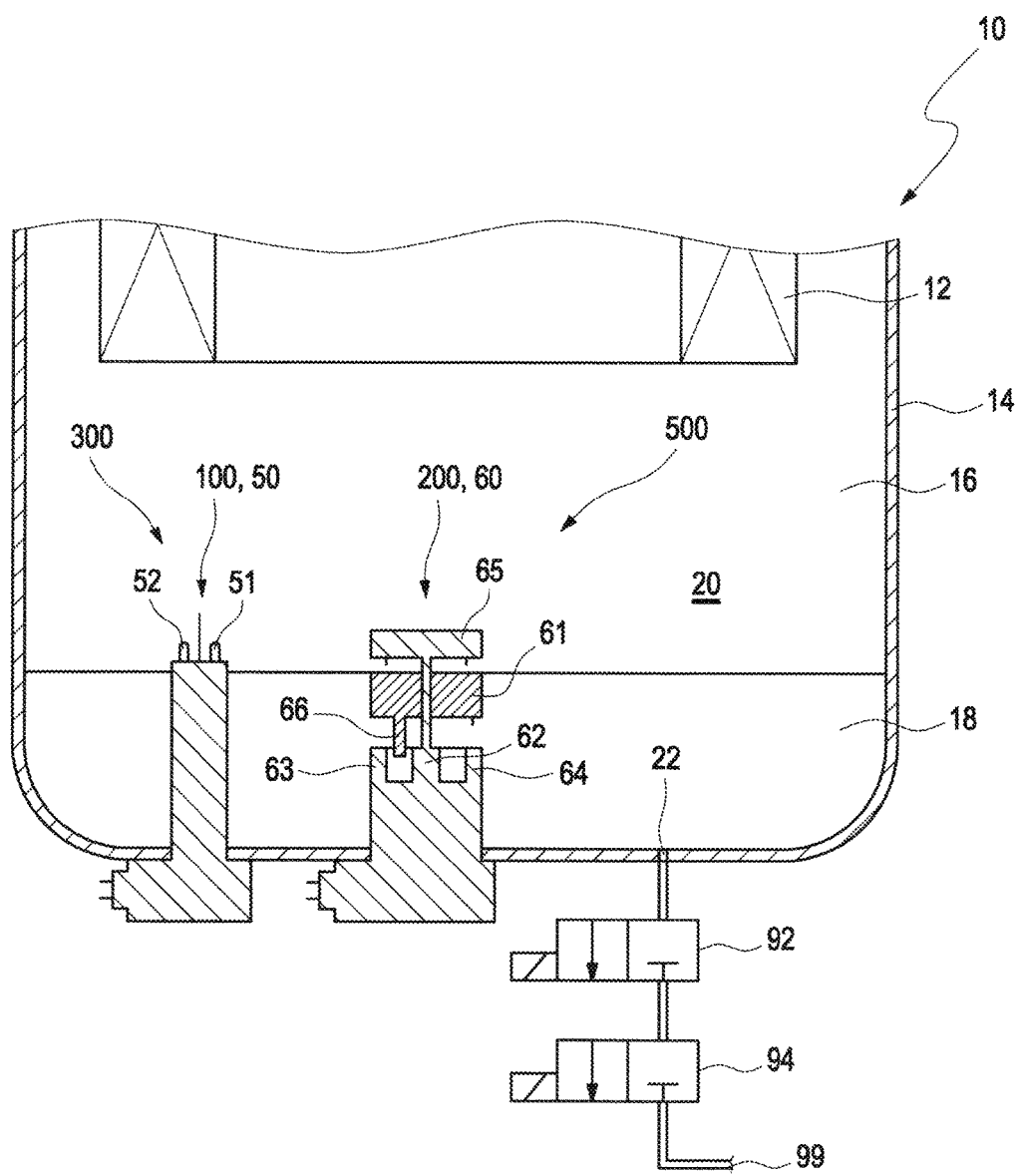
FIG. 2 shows a schematic illustration of a filter system with a filter element and a drain control device according to an embodiment of the invention with a resistance sensor and an optical sensor.
Figure 3:
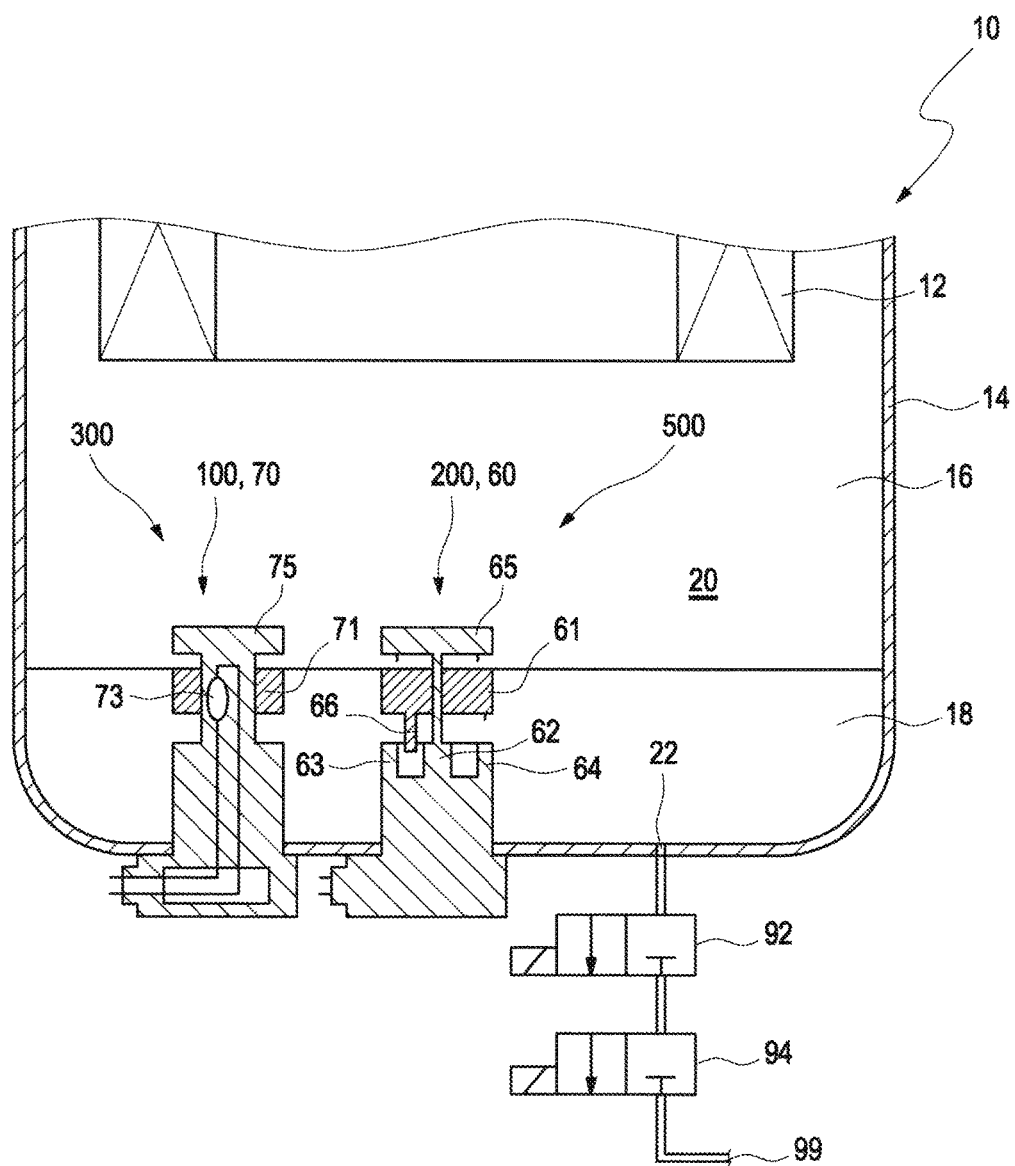
FIG. 3 shows a schematic illustration of a filter system with a filter element and a drain control device according to an embodiment of the invention with an optical sensor and a magnetic field sensor.

FIGS. 2 and 3 show respectively a schematic illustration of a filter system 10 with a housing 14 and a filter element 12, arranged therein preferably so as to be exchangeable, as well as a collecting chamber 20 with a drain control device 500 in accordance with a respective embodiment of the invention. The collecting chamber 20 can be emptied through a media outlet 22 wherein at the media outlet 22 a valve arrangement with, for example, two shut-off valves 92, 94 connected fluidically in series is arranged.

A media mixture that contains a first medium 16, for example, diesel fuel, and a second medium 18, for example, water, is supplied to the filter system 10. The second medium 18 is separated from the first medium 16 in a generally known manner. When the second medium 18 is heavier than the first medium 16, the second medium 18 collects at the bottom area of the collecting chamber 20. This causes the filling level of the second medium 18 to rise over time. In order to prevent that the second medium 18 will mix again with the first medium 16 or even reach together with the first medium 16 the clean side of the filter, the second medium 18 must be removed in due time from the collecting chamber 20. On the other hand, if possible, no first medium 16 should reach the media outlet 22 of the collecting chamber 20.

The drain control device 500 comprises in addition to the valve arrangement at least a first sensor unit 100 and a second sensor unit 200, wherein the sensor units 100, 200 are based on different action principles, i.e., different physical parameters of a medium present in the collecting chamber 20 are detected. Conceivable is in principle also that a sensor unit is provided that detects a chemical parameter. The sensor units 100, 200 are provided with conventional electronic evaluation devices, not otherwise specified, and electrical connectors. The electronic evaluation devices can act directly or indirectly, in particular by a control device, on the shut-off valves 92, 94 in order to open them and in this way empty the collecting chamber 20 at least partially.

The sensor units 100, 200 are arranged in the collecting chamber such that it is ensured that the second medium 18 that is collecting over time does not reach the bottom edge of the filter element 12, but such that the sensor units 100, 200 recognize in due time beforehand the presence of the second medium 18 at a certain filling level in the collecting chamber 20 and that this is realized as a drain criterion. When all required conditions are fulfilled, the valve arrangement is opened and is closed again upon or after reaching a closing criterion, for example, after a predetermined drainage duration of the second medium 18 or when the latter has dropped below a certain filling level.

In this context, the embodiment of FIG. 2 shows a sensor arrangement 300 with a first sensor unit 100 with a resistance sensor 50 and a second sensor unit 200 with an optical sensor 60, as described in FIG. 1.

The resistance sensor 50 detects by means of two electrodes 51, 52 the ohmic resistance of the medium 16, 18 in the collecting chamber 20. Water (second medium 18) has an ohmic resistance which is significantly different from that of diesel fuel (first medium 16). By means of the electrodes 51, 52, an area in the collecting chamber 20 is monitored in which, in case of absence of water (second medium 18), a medium 16 is located which has a greater resistance than water. When water is separated by the upstream conventional water separating mechanism of the filter system 10, the area surrounding the electrodes 51, 52 is filled with water and a reduced ohmic resistance is measurable compared to the area being filled with the first medium 16.

The embodiment in FIG. 3 shows a sensor arrangement 300 with a first sensor unit 100 with an optical sensor 60, as described in FIG. 1, and a second sensor unit 200 with a magnetic field sensor 70. For example, the magnetic sensor 70 comprises a reed switch 73.

The magnetic field sensor 70 detects a magnetic field which penetrates the medium 16, 18 contained in the collecting chamber 20. A float 71 is arranged to be movable along a float guide 75. The float 71, due to the density of the float material, has the property that it swims in water (second medium 18) and sinks in diesel fuel (first medium 16).

The float 71 is comprised of a material which can permanently maintain and/or store a magnetic field; or the float 71 contains a permanent magnet. By the arrangement of float 71 and reed switch 73 in the collecting chamber 20, the float 71 rises in the presence of water. When the water has risen to a corresponding level, the float 71 moves into the area of the reed switch 73. Due to the magnetic field which is surrounding the float 71, the reed switch 73 of the magnetic field sensor 70 is activated and changes its state. In this context, the reed switch 73, as needed, can be designed as an opener or closer so that it opens in the presence of the magnetic field or closes in the presence of the magnetic field.

Alternatively, a shielding of a magnetic field (for example, of a permanent magnet) that is mounted in fixed relation to the reed switch 73 can be realized by the float 71. In this way, a deactivation of the reed switch 73 in the presence of water occurs. For this purpose, the float 71 can have magnetically shielding properties, preferably consists of Mu-metal.

Conceivable is also a use of more than one reed switch 73 in a configuration for detecting the position of the magnetic float 71 and for monitoring the presence of the float 71, which provides a diagnostic capability of the sensor system. In a configuration with more than one reed switch 73, reed switches 73 are expediently combined as opener and closer.

The magnetic field sensor 70 can also be embodied as Hall sensor, magnetic resonance sensor, and the like which checks the presence of the magnetic float 71 at the corresponding position and in this way senses whether water or whether diesel fuel is present at this position. Here, also more than one magnetic field sensor 70 can be employed in order to more precisely determine the position of the float 71 and to detect the principal presence of the float 71. This makes possible diagnosability and plausibility check of the sensor system. When using such a magnetic field sensor 70, an additional electronic evaluation device can be employed.

When it is detected with one of the described embodiments that the second medium 18 has reached a certain filling level in the collecting chamber 20, the valve mechanism is activated depending on the signal of the sensor units 100, 200 and opens the collecting chamber 20 to the exterior or to a further collecting chamber. In this way, the second medium 18 is discharged through the opened cross section of the media outlet 22, for example, driven by the pressure of the first medium 16 or driven by the force of gravity, or driven by a chamber downstream of the collecting chamber 20 that is at a pressure that is lower than the pressure in the collecting chamber 20.

Figure 4:
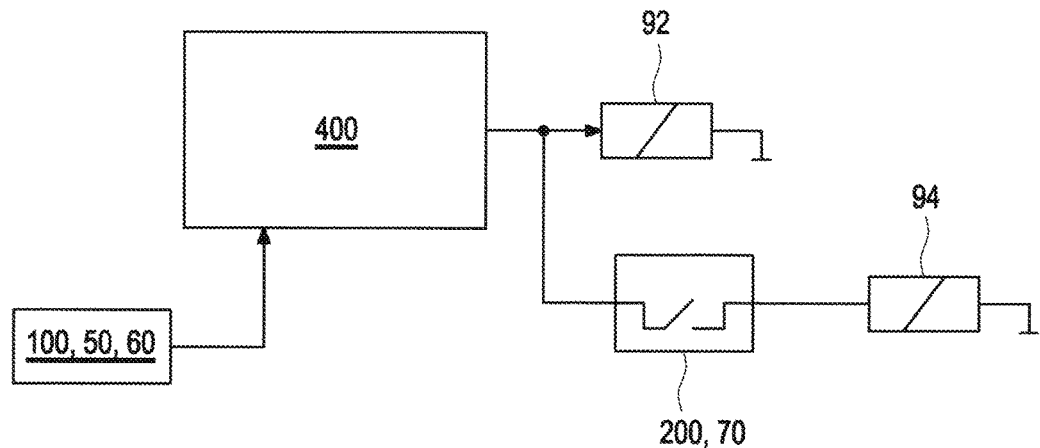
FIG. 4 shows a block diagram of an electrical circuitry of a drain control device according to an embodiment of the invention.

FIG. 4 shows a block diagram of an electrical circuitry of a drain control device 500 according to an embodiment of the invention.

Two shut-off valves 92, 94 are connected in series in accordance with the FIGS. 2 and 3 wherein the shut-off valve 92 is arranged upstream, i.e., in flow direction in front of the shut-off valve 94. Each sensor unit 100, 200 has correlated therewith a separate shut-off valve 92, 94.

A first sensor unit 100 is coupled with a control device 400 which controls the shut-off valve 92 arranged upstream. The control device 400 can be, for example, a vehicle control unit.

The second sensor unit 200 directly controls the shut-off valve 94 which is arranged downstream. The passage through the two shut-off valves 92, 94 is possible not until both sensor units 100, 200 have indicated the presence of the second medium 18 in the collecting chamber 20.

This circuitry is beneficial when the second sensor unit 200 is a magnetic field sensor 70 with reed switch and the first sensor unit 100 is an optical sensor 60, i.e., beneficial for a combination of a magnetic field sensor 70 with an optical sensor 60.

Figure 5:
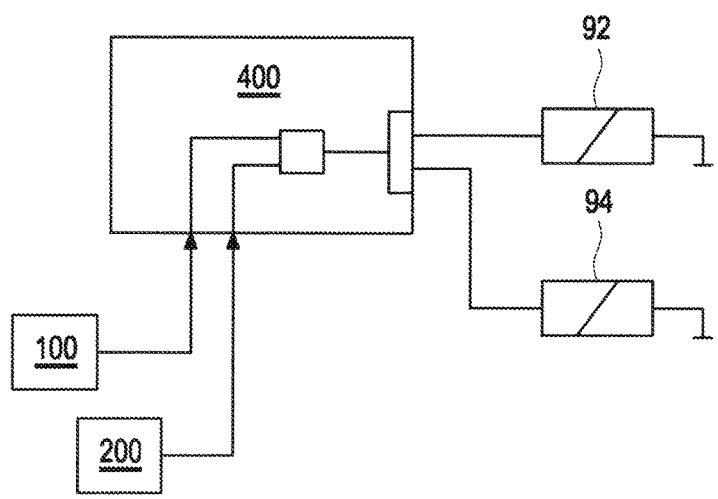
FIG. 5 shows a block diagram of an electrical circuitry of a drain control device according to a further embodiment of the invention.

FIG. 5 shows a block diagram of an electrical circuitry of a drain control device 500 according to a further embodiment of the invention.

The sensor units 100, 200 are both coupled with a control device 400 which is provided for controlling the shut-off valves 92, 94. The control device 400 can be, for example, a vehicle control unit.

The sensor signals of the sensor units 100, 200 are received and processed in the control device 400. Only when both sensor units 100, 200 indicate the presence of the second medium 18 in the collecting chamber 20, the control device 400 controls both shut-off valves 92, 94 at the same time and opens them.

Figure 6:
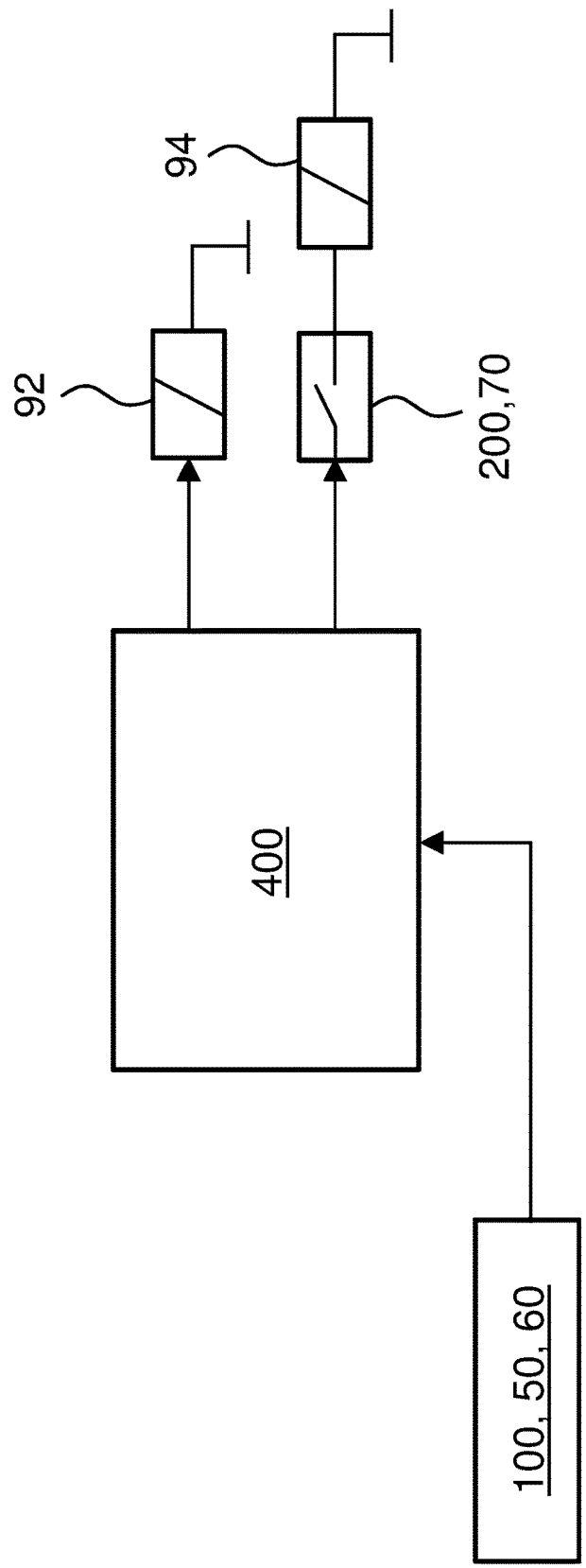
FIG. 6 shows a further block diagram of an alternative electrical circuitry of a drain control device according to an embodiment of the invention.

The block diagram of FIG. 6 illustrates an alternative circuitry of the first and second sensor units 100, 200. While in the circuitry variant illustrated in FIG. 4 by means of a common output of the control device 400, which is controlled as a function of the sensor signal of the first sensor unit 100, the first shut-off valve 92 as well as the second shut-off valve 94 can be supplied with current, according to the variant illustrated in FIG. 6 it is provided that the first shut-off valve 92 and the second shut-off valve 94 are connected to two separate outputs of the control device 400. Functionally, i.e., with respect to control of the shut-off valves 92, 94, the variants do not differ; in the embodiment according to FIG. 6 it is also provided that the drain channel is opened not until the first sensor unit 100 as well as the second sensor unit 200 detect the presence of water.

The advantage of the embodiment according to FIG. 6 lies in an expanded diagnostic functionality; while in the circuitry according to FIG. 4 the two parallel-connected coils of the shut-off valves 92, 94 limit the diagnostic possibility, according to FIG. 6 no direct parallel switching is existing and the sensor function of the second sensor unit 200 can be detected by a diagnostic resistor.

In an embodiment, not illustrated, the second sensor unit which is a reed contact can comprise a protection circuit.

While specific embodiments of the invention have been shown and described in detail to illustrate the inventive principles, it will be understood that the invention may be embodied otherwise without departing from such principles.

What is claimed is:

1. A drain control device for a filter system for filtering a media flow comprising a first medium and a second medium, wherein
the filter system has a collecting chamber having a media outlet, the collecting chamber configured to collect the second medium separated from the media flow and comprising
a media outlet; the drain control device comprising:
a sensor arrangement comprising at least a first sensor unit and a second sensor unit, wherein the first and second sensor units are configured to detect a filling level of the second medium in the collecting chamber and wherein the first sensor unit comprises a first optical sensor;
a plurality of shut-off valves configured to be arranged at the media outlet;
wherein at least two of the plurality of shut-off valves are fluidically connected directly one after the other in series to the media outlet of the collecting chamber;
wherein the first sensor unit is operatively connected with one of the at least two shut-off valves to automatically drain the second medium from the collecting chamber through the media outlet when a predetermined filling level of the second medium in the collecting chamber is reached;
wherein each sensor unit is positioned at least partly within the collecting chamber and can activate a respective shut-off valve of the at least two shutoff valves independently such that passage of the collected second medium through the series connection of the at least two shut-off valves is blocked until the first sensor unit and the second sensor unit both independently detect the presence of the second medium in the collecting chamber.

2. The drain control device according to claim 1, wherein the first and the second sensor units operate based on a different action mechanism, respectively.

3. The drain control device according to claim 2, wherein the first and the second sensor units form a common sensor component group.

4. The drain control device according to claim 2, wherein the first and second sensor units each separately have one of the shut-off valves operatively associated therewith.

5. The drain control device according to claim 4, wherein one of the first and second sensor units is configured to directly control the associated shut-off valve.

6. The drain control device according to claim 5, further comprising
a control device,
wherein the other one of the first and second sensor units is coupled with the control device configured to control the other one of the shut-off valves.

7. The drain control device according to claim 2, further comprising
a control device configured to control the plurality shut-off valves,
wherein the first and second sensor units are coupled with the control device.

8. The drain control device according to claim 1, wherein the sensor arrangement further comprises
a sensor unit with a resistance sensor that detects an electrical resistance of the first medium and/or the second medium contained in the collecting chamber.

9. The drain control device according to claim 1, wherein the sensor arrangement further comprises
a sensor unit with a magnetic field sensor that detects a magnetic field which penetrates the first medium and/or the second medium contained in the collecting chamber.

10. The drain control device according to claim 9, wherein the magnetic field sensor comprises a reed switch.

11. The drain control device according to claim 10, further comprising
a magnetic float disposed in the collecting chamber,
wherein the reed switch interacts with the magnetic float,
wherein the magnetic float rises in the presence of the second medium in the collecting chamber.

12. The drain control device according to claim 10, further comprising
a float disposed in the collecting chamber,
wherein the reed switch is arranged in a permanent magnetic field that can be shielded by the float,
wherein the float rises in the presence of the second medium in the collecting chamber.

13. The drain control device according to claim 1, wherein the sensor arrangement further comprises
a sensor unit with a capacitive sensor.

14. The drain control device according to claim 1, further comprising
a float disposed in the collecting chamber,
wherein the first optical sensor interacts with the float such that, above the predetermined filling level of the second medium in the collecting chamber, a light path between a light source of the first optical sensor and a radiation receiver is opened.

15. The drain control device according to claim 1, wherein the first optical sensor is embodied for determining an optical refractive index of the first and/or second medium contained in the collecting chamber.

16. The drain control device according to claim 1, further comprising
a float disposed in the collecting chamber,
wherein the sensor arrangement comprises
a second optical sensor,
wherein the first and second optical sensors have a common light source,
wherein the first optical sensor interacts with the float such that above the predetermined filling level of the second medium in the collecting chamber a light path between the light source and a radiation receiver is opened, and
wherein the second optical sensor is configured to determine an optical refractive index of the first medium and/or the second medium contained in the collecting container.

17. A filter system for filtering a media flow comprising a first medium and a second medium, the filter system comprising:
a housing;
a filter element arranged in the housing;
a collecting chamber configured to collect the second medium separated from the media flow and comprising a media outlet;

a drain control device comprising:
- a sensor arrangement comprising
  - at least a first sensor unit and a second sensor unit, wherein the first and second sensor units are configured to detect a filling level of the second medium in the collecting chamber;
  - wherein the first sensor unit comprises a first optical sensor;
- a plurality of shut-off valves configured to be arranged at the media outlet;
- wherein at least two of the plurality of shut-off valves are fluidically connected directly one after the other in series to the media outlet of the collecting chamber;
- wherein the first sensor unit is operatively connected with one of the at least two shut-off valves to automatically drain the second medium from the collecting chamber through the media outlet when a predetermined filling level of the second medium in the collecting chamber is reached; and
- wherein each sensor unit is positioned at least partly within the collection chamber and can activate a respective shut-off valve of the at least two shutoff valves independently such that passage of the collected second medium through the series connection of the at least two shut-off valves is blocked until the first sensor unit and the second sensor unit both independently detect the presence of the second medium in the collecting chamber.

18. The filter system according to claim 17, wherein the filter element is exchangeable.

19. The filter system according to claim 17, wherein the first and the second sensor units operate based on different action mechanisms, respectively.

* * * * *